United States Patent
Kellström

[11] Patent Number: 6,132,097
[45] Date of Patent: Oct. 17, 2000

[54] ROLLER BEARING WITH MEANS FOR GIVING THE ROLLERS A POSITIVE SKEW ANGLE

[75] Inventor: Magnus Kellström, Partille, Sweden

[73] Assignee: SKF Aktiebolaget, Gothenberg, Sweden

[21] Appl. No.: 09/308,520

[22] PCT Filed: Nov. 14, 1997

[86] PCT No.: PCT/SE97/01917

§ 371 Date: Aug. 4, 1999

§ 102(e) Date: Aug. 4, 1999

[87] PCT Pub. No.: WO98/22724

PCT Pub. Date: May 28, 1998

[30] Foreign Application Priority Data

Nov. 21, 1996 [SE] Sweden ................................ 9604286

[51] Int. Cl.$^7$ .................................................. F16C 33/58
[52] U.S. Cl. ............................................................... 384/450
[58] Field of Search .................................. 384/450, 569, 384/565, 568, 571

[56] References Cited

U.S. PATENT DOCUMENTS 3,990,753  11/1976  Kellstrom et al. .
5,586,826  12/1996  Kellström et al. .

*Primary Examiner*—Lenard A. Footland
*Attorney, Agent, or Firm*—Burns, Doane, Swecker & Mathis, L.L.P.

[57] ABSTRACT

A roller bearing of the type incorporating an outer and an inner race ring (1, 3) having confronting race tracks (2, 4), with lands (A, B) situated axially outside said race tracks and a number of rollers (5) being interposed between and in contact with said race tracks, said rollers (5) and race tracks (2, 4) having longitudinal section profiles of a radious of curvature, which is bigger than the distance between the outer race track and the axis of the bearing, as measured perpendicularly to the race track, which rollers (5) thereby are axially movable along the race tracks without being hindred by axial limitations at the race tracks, in order to allow relative misalignment and axial displaceability of the race tracks, wherein at least portions of the areas (A, B, G, J) of the race rings axially outside the zone (H) subjected to bearing load, have such surface finish and/or profile as to contribute in giving the rollers (5) a positive skew angle.

2 Claims, 1 Drawing Sheet

ROLLER BEARING WITH MEANS FOR GIVING THE ROLLERS A POSITIVE SKEW ANGLE

The present invention relates to a roller bearing of the type incorporating an outer and an inner race ring having confronting race tracks and a number of rollers being interposed between and in contact with said race tracks, said rollers and race tracks having longitudinal section profiles of a radius of curvature which is bigger than the distance between the outer race track and the axis of the bearing, as measured perpendicularly to the race track, which rollers thereby are axially movable across the race tracks without being hindred by axial limitations at the race tracks, in order to allow relative misalignment and axial displaceability of the race tracks and it refers to such a roller bearing having means for giving the rollers a positive skew angle, when axially displaced.

Bearing of this type are known e.g. from EP-B1-0175858 and EP-B1-0520968, and they combine different advantages from other types of bearings, such as axial mobility as a cylindrical roller bearing, self alignment as a spherical roller bearing and low section height as a needle roller bearing.

The present type of bearing has the ability of allowing axial displacement between the rollers and the race rings and also between the two race rings, and it also permits high degrees of misalignment. When the rings of such a bearing are displaced axially, the contact angle resulting therefrom is small. Particularly when the internal clearance of the bearing is small, or when the bearing is pre-loaded, it is essential that the skew rolling angle, if any, is positive or zero, as otherwise there can be a tendency that the race rings are pulled in over each other, thereby risking that the rollers are being jammed between the race tracks, if the axial guidance of the shaft from other bearings is poor or absent.

The skew angle is defined as positive when the axial friction forces from the roller on the race ways arising as a result of roller skew, have the same axial direction as the axial component of the normal load from the roller on the raceway.

A positive skew angle gives the bearing capability of taking up more thrust, whereas a negative skew angle reduces this capability and even might damage the bearing. In rolling bearings it is often desirable to control that the bearing has a positive skew angle in order to ascertain that the friction forces emanating from the contact between the roller and its adjoining race tracks cooperate with the friction forces at normal rolling for giving the rolling bodies a minimum of friction under load, and this is often achieved by giving the race track surfaces, i.e., the surfaces of the race rings against which the roller normally rolls, certain surface patterns.

In a bearing of the type now concerned, it however is possible to obtain roller skew control, e.g. for avoiding the above mentioned tendencies that the race rings are pulled in over each other, also in other manners, and this is achieved in accordance with the characterizing part.

BRIEF DESCRIPTION OF THE FIGURES

Hereinafter the invention will be further described by way of an embodiment schematically shown in the accompanying drawing.

FIG. 1 of the drawing shows a section through a portion (half) of a bearing of the type referred to and incorporating an outer race ring 1 having at its inner envelope surface a first race track 2, and an inner race ring 3, having at its outer envelope surface a second race track 4. These two race tracks 2, 4 define between them an annular space occupied by a number of rollers 5. The race rings 1, 3 are shown in cross section, although they are not hatched in order to increase the clearness of the presentation.

Figure 1:
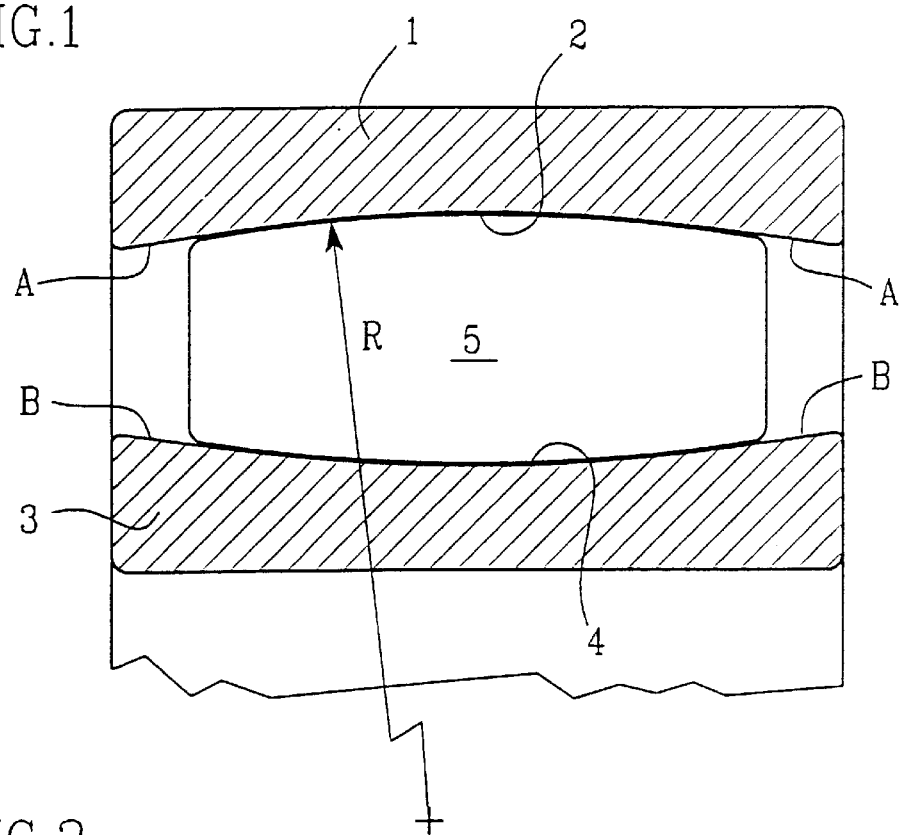
FIG. 1 shows a section through a roller bearing of the type concerned in a neutral position.

The rollers 5 and the race tracks 2, 4 of the bearing of this type have essentially the same radius of curvature R, and this radius of curvature is bigger than the geometrical radius of the bearing itself.

The rollers 5 in such a bearing contact the outer race track 2, the inner race track 4 and in the case the bearing has a roller cage (not shown in the drawing), which keeps the rollers spaced apart in the circumferential direction, also this cage. In operation, the rollers 5 normally assume a certain angle relative to the direction of rolling, resulting in both rolling and axial sliding motion and this angle is termed the skew angle, defined as the angle between the axis of rotation of the roller and a plane normal to the path of relative motion of the raceways confronting the rollers.

In FIG. 1 the bearing is shown with the race rings 1 and 3 and the rollers 5 in neutral positions, i.e. the race rings are neither angularly nor axially displaced relative to each other and the rollers are positioned centrally and having the roller axis at least substantially parallel to the bearing axis. In this position the rollers contact only the race tracks 2 and 4 resp. of the race rings, whereas the lands positioned on both sides axially outside the race tracks 2 and 4, and in the drawing marked A and B resp., are unoccupied by the rollers 5.

Figure 2:
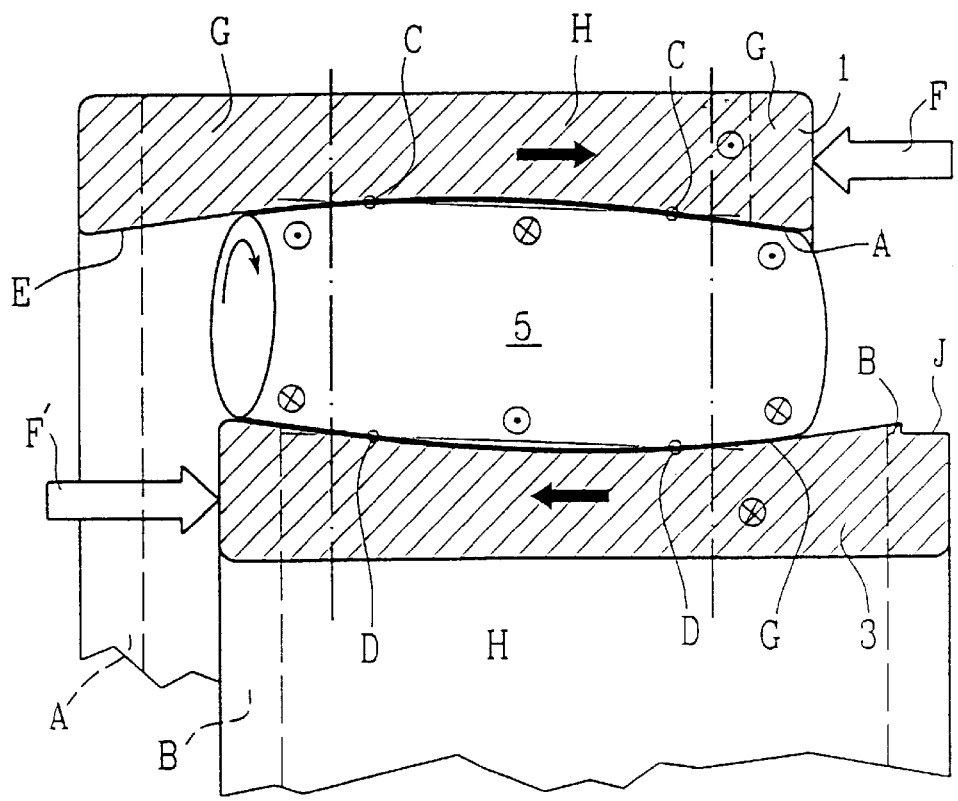
FIG. 2 is a view corresponding to FIG. 1, but with the bearing rings and the rollers in axially displaced positions.

FIG. 2 shows in a view corresponding to FIG. 1, the bearing i.a. subjected to an axial load F, (and a similar counterload F') under which load the race rings 1 and 3 and the rollers 5 are axially displaced relative to each other. For simplicity we now will put the viewer in the coordinate system of the roller. The outer race ring 1 then rotates in a relative direction as compared to the inner race ring 3 shown with a pointed circle in FIG. 2, representing a motion against the viewer, whereas the inner race ring 3 rotates in a direction away from the viewer as shown with a crossed circle. Under these conditions and subjected to the axial load F, the roller 5 will have a pure rolling contact with each race track 2 and 4 resp. only in two points, intimated as C and D, whereas the roller in other positions along its axial extension will be subjected both to rolling and sliding motion, resulting in peripheral sliding influences on the roller as shown with the same type of direction markings as on the race rings.

For reducing the tendencies for the rollers 5 from taking up negative skew angles under such conditions it now is suggested to utilize the areas axially outside the zone H, wherein the rollers are normally subjected to load. Each one of these areas consists of a land A or B resp. and a portion G outside said load zone H, wherein the rollers normally will be unloaded, for providing the bearing of this type with means ascertaining that the rollers will be subjected to forces which tend to give the roller a positive skew angle. This can be obtained in that the contacts between the unloaded areas G and/or the lands A, B and the rollers 5 are designed in such a manner as to give as low frictional forces as possible.

This can be achieved either by giving the unloaded areas G, and/or the lands such high surface finish as possible resulting in a very low coefficient of friction at contact with the these regions, or by making the land with a modified profile portion, i.e. an extension not continuously following the extension of the race track profile, but being somewhat outwardly offset in radial direction from this as seen in a direction away from the roller centre, such as intimated at E at the land A in FIG. 2. Such effect can also be obtained with other known modifications of the surface topography of the lands. Another possibility is to provide at least one outer portion of said areas with a recess, such as intimated at J.

The invention is not limited to the embodiment shown and described but can be varied and modified within the scope of the accompanying claims, and although the bearing has been shown as a cage-less bearing it is evident that roller skew guidance can be achieved in the same manner also with a bearing with the rollers guided in a cage. Although not specifically mentioned or shown it also is evident that the means for ascertaining positive roller skew angle can be provided on one or both race rings.

What is claimed is:

1. Roller bearing comprising an outer and an inner race ring having confronting outer and inner race tracks respectively with lands situated axially outside said outer and inner race tracks and a number of rollers provided between and in contact with said outer and inner race tracks, the rollers and outer and inner race tracks having longitudinal section profiles with a radius of curvature, which is bigger than a distance between the outer race track and an axis of the bearing, measured perpendicularly to the outer race track, the rollers being axially movable along the outer and inner race tracks without being hindred by axial confinements at the outer and inner race tracks for the purpose of permitting relative misalignment and axial displaceability for the outer and inner race tracks, at least portions of areas in the inner and outer race rings, in non-displaced position situated axially outside a zone, which is subjected to bearing load, having a surface finish and/or profile that contributes in giving the rollers a positive skew angle, and which is achieved by either that these areas are surfaces having reduced friction in form of smooth surfaces, that these surfaces have modified profile portions which reduce contact pressure between these areas and the rollers at conditions of mutual displacement between the race rings in the axial direction, and that said areas have at least one recessed portion.

2. Roller bearing as claimed in claim 1, said areas on the race rings are the lands situated axially outside the race tracks.

* * * * *